E. A. RICHTER.
INTERIOR ILLUMINATION.
APPLICATION FILED MAR. 6, 1917.

1,249,500.

Patented Dec. 11, 1917.
2 SHEETS—SHEET 1.

WITNESS
A. N. Mason

INVENTOR.
Edward A. Richter,
By H. W. Stevenson
Attorney

E. A. RICHTER.
INTERIOR ILLUMINATION.
APPLICATION FILED MAR. 6, 1917.
1,249,500.
Patented Dec. 11, 1917.
2 SHEETS—SHEET 2.
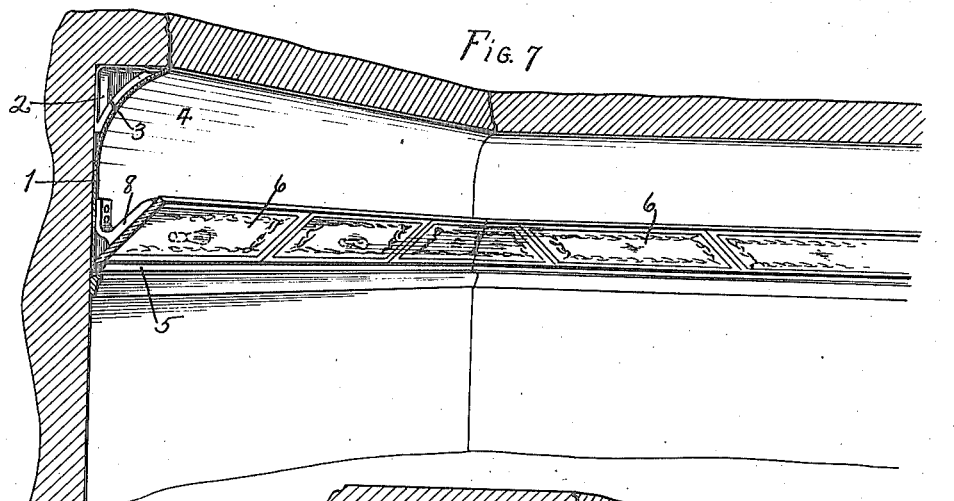
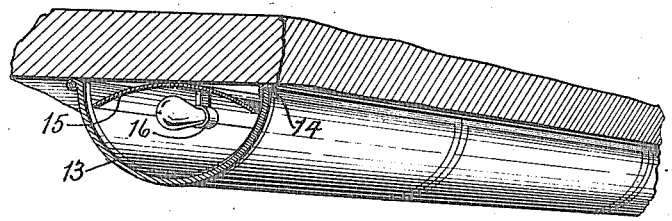
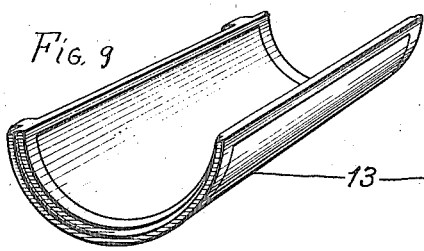
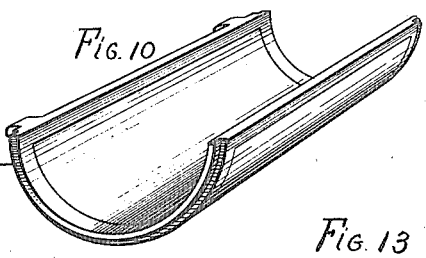
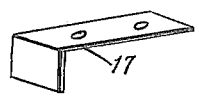
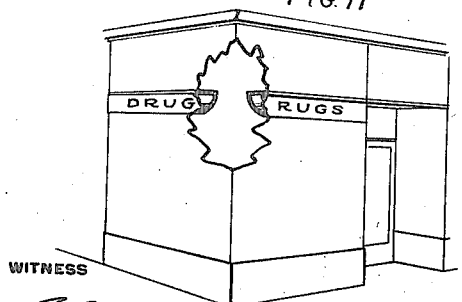
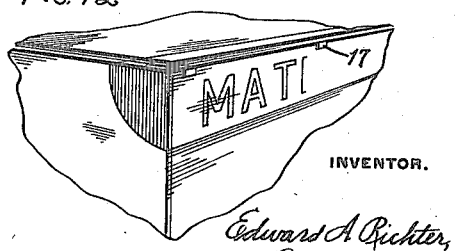

UNITED STATES PATENT OFFICE.

EDWARD A. RICHTER, OF PITTSBURGH, PENNSYLVANIA, ASSIGNOR TO THE MATHIEU CORPORATION, OF PITTSBURGH, PENNSYLVANIA, A CORPORATION OF DELAWARE.

INTERIOR ILLUMINATION.

1,249,500.  Specification of Letters Patent.  Patented Dec. 11, 1917.

Application filed March 6, 1917. Serial No. 152,615.

*To all whom it may concern:*

Be it known that I, EDWARD A. RICHTER, a citizen of the United States, residing at Pittsburgh, in the county of Allegheny and State of Pennsylvania, have invented a certain new and useful Improvement in Interior Illuminations, of which the following is a specification.

My invention has for its primary object the provision of a detachable and segmentally constructed border light trough or strip, for the express purpose of providing what is commonly known and designated by the trade, and those familiar with the illuminating art, as "cove" lighting, whereby semi-indirect light rays may be utilized for illuminating purposes, with particular reference to interior lighting of rooms, auditoriums, halls, etc.

The main advantage and practicability of my invention resides in its utility for interiors that were not originally designed and equipped with the permanently constructed border light trough or cove, whereby, at a minimum of expense and labor, my device can be installed for the purpose of furnishing interior illumination of the semi-indirect character, without having to erect a permanent plastered and comparatively expensive border addition.

My improved and convenient lighting device can be fabricated at a distant point, conveyed to the building in sections of predetermined size, and quickly erected without necessarily disturbing or inconveniencing the occupant of the room or auditorium.

The accompanying drawings illustrate the preferred embodiment of my invention, together with several modifications thereof, which I desire it understood are subject of still further changes in the detail construction, as may develop with additional experimenting and reduction to practice, without departing from the original and fundamental spirit and intention of the invention.

Figure 1:
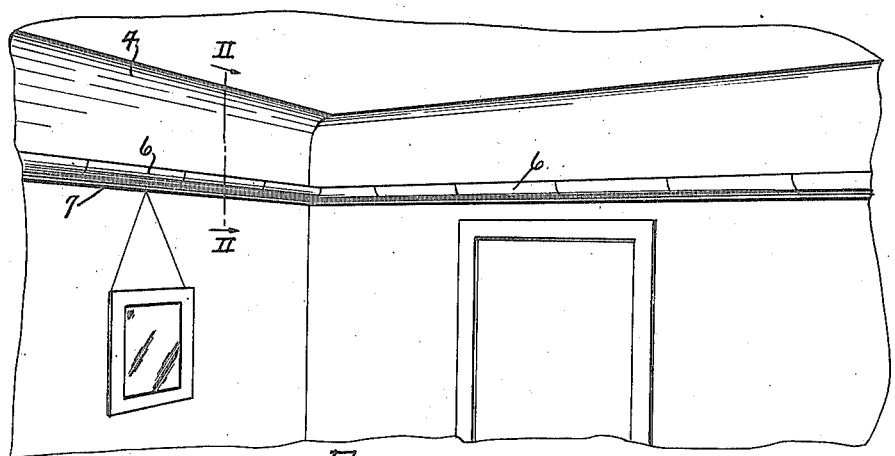
Figure 2:
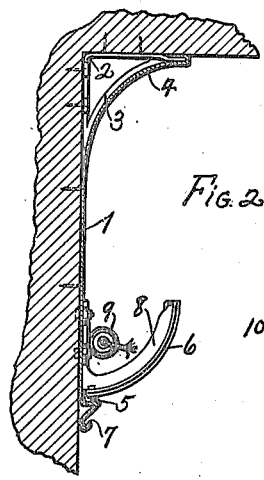
Figure 3:
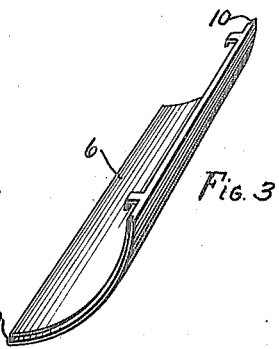
Figure 4:
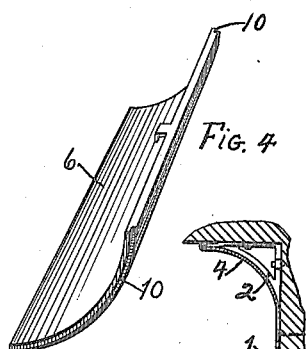
Figure 5:
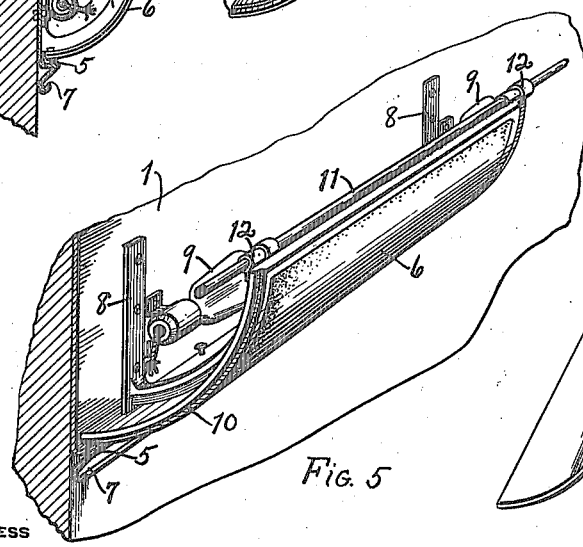
Figure 6:
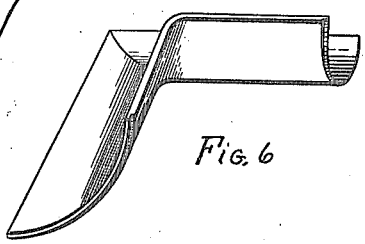

Referring then to said drawings Figure 1 illustrates in perspective the relative functional position of my invention as removably secured to the walls and ceiling of a room; Fig. 2 is a vertical section taken on the line 11—11 of Fig. 1 looking in the direction indicated by arrow points, showing upper and lower disposed bracket supports; Fig. 3 shows one of the arc-shaped lower disposed trough segments, and Fig. 4 shows a modified construction of this same member; Fig. 5 shows another view in perspective of a modified arrangement involving a supporting rod and hinge construction; Fig. 6 is a view in perspective of one of the corner members; Fig. 7 shows still another modification of my invention in its relative corner position, substituting an approximately flat outer surface for the curved surface shown in the other views; Fig. 8 shows a further modification involving a semi-circular light confining trough, as supported in close proximity to the ceiling; Fig. 9 is a detail in perspective of one of the segments comprising the trough shown in Fig. 8; Fig. 10 is a similar view of another form of trough segment; Fig. 11 shows the method of applying my illuminating device to a show window; Fig. 12 is a view illustrating the application of my device to a show case; Fig. 13 is an enlarged view of a fastening clip member employed in the show case construction and Fig. 14 discloses a simplified construction of the light trough and reflector element as made in one integral unit.

As shown in the drawings this border light trough is designed to be built up or erected by means of a plurality of closely engaging and associated segments, which have been previously fabricated, the detail construction of all the segments being identical, with the exception of the angular members intended for the corners or other irregular sections of the room, as for instance alcoves, bays, and similar well known details of interior arrangement and architecture.

Constructively the formation of each and every segmental portion of the light trough involves the rearwardly disposed member 1, which is rigidly held and securely fastened against the wall and ceiling of the room by means of adequate braces or hangers 2, these latter elements being of a size, configuration and strength suitable for their intended function as supports, and are preferably of the angular shape shown herewith in order to closely engage in the juncture of the walls and ceiling, said members 2 having a curved outer section 3 uniting the two arms of the hangers, and constituting a reinforcement or brace for the overhanging curved upper section 4 of the member 1, whereby the predetermined curvature given to this said upper portion 4 may be held rigid and thus prevented from warping or getting out of shape, due to natural expansion or other causes.

The lower extremity of said member 1 may be provided with an up-turned flange or ledge portion 5, forming a longitudinal recess or gutter, which ledge and gutter serves as a means for supporting and locking the inner disposed edge of the lower curved member 6, said member 1 may be further bent at its lower extremity to form a second longitudinal groove 7 that serves as a picture molding or support for hanging wall decorations of whatever nature.

Said lower disposed member 6, which constitutes the outer wall of the light trough, may be constructed either in the curved configuration illustrated in Figs. 1 to 6 inclusive, or else in the approximately flat configuration shown in Fig. 7, the lower inner edge of this member 6 closely engaging against the vertical wall of the member 1, immediately above and supported by the before mentioned ledge 5, the upper and outer disposed edge of this member 6 being at some distance removed from the said member 1, the angle of incline or degree of radius accorded this said member 6 determining the maximum width of the trough.

These said members 6 are rigidly held in position and supported by suitable brace elements 8 secured to the vertical wall of the member 1 in any suitable manner. Supported by the rear wall 1, and concealed from the line of vision, in the trough, back of the members 6, are the plurality of electric lamps 9 in properly wired circuit.

The two end sections of each abutting member 6 is provided with a suitable flange portion 10 whereby, when the associated curved segments of the trough are in proper registering alinement one with the other, that an interlocking feature will prevail at the juncture of each contiguous segment, in order that there may be no gap or space at this point, the full assembled trough segments thus presenting the appearance of an approximately continuous and uninterrupted construction.

The outer edge of the curved portion 4 is preferably turned back over itself, as shown in Fig. 2, forming a groove or loop designed to house and partially embrace the outer extremity of the bracket members 2, in order to present an unbroken line at this point when viewed from below.

All, or a predetermined portion of, the trough segments may be made adjustable by a pivotal or hinge construction, shown in Fig. 5, a rod element 11 or other equivalent, threaded through the outer ends of the hangers 8, serving as a support and connection for the hinges 12 carried by said segments, or any other adequate substitute arrangement may be made whereby at least each alternate segment will be made to swing outwardly from its normal attitude, in order to permit replacement of burnt-out lamps, or for cleaning purposes.

Figure 14:
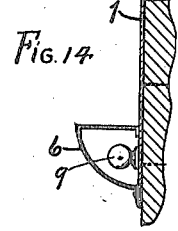

As a cheaper and simplified construction for the foregoing described trough and reflector, reference is had to Fig. 14 of the drawing, which shows the possibility of making the main part of the segment in one integral unit piece, this form having advantage and utility whenever it is desired to have the trough entirely of an opaque nature, and thus utilize the inner surface of the trough as a light reflecting medium.

In the modified construction shown in Fig. 8 the light trough is composed of a plurality of closely engaging and interlocking segments 13 of a substantially semi-circular configuration, which modified trough is designed to be adequately supported close to the ceiling or walls of the room at any desired position, the logical point being at or near the approximate center line of the ceiling. The associated segments comprising this modified form of trough are also preferably hinged and involve a suitable fastening means 14.

Positioned within this said modified light trough, in longitudinal alinement therewith, is a convex-shaped or arched-over member 15 designed as a light reflecting element, to the under surface of which is secured a plurality of electric lamp sockets 16 in properly wired circuit. This said element 15 is preferably made of metal and should be coated with a suitable paint or enamel capable of performing its intended function as a light reflecting medium.

The fundamental object of my invention being to utilize semi-indirect light rays to illuminate the interior of a room, by means of the novel form of trough and reflectors hereinbefore described in detail, the source of light being concealed from the direct line of vision, it is apparent that various substitute lighting schemes are possible with the several designs illustrated in the drawings, and that a multiplicity of lighting effects can be produced by employing suitable material and appropriate configurations.

In the arrangement disclosed in Fig. 1 the curved members 6 are preferably made of some translucent material which, when illuminated from the rear by means of the properly positioned lamps, will insure soft diffused light rays and, when taken in conjunction with the curved reflector portion 4, which is made of an opaque material suitably coated with a paint or enamel capable of reflecting light rays, the room will be flooded with light.

Again, it is practical, and in many cases advantageous, to construct said radially disposed member 6 from a material wholly opaque, or substantially so, and derive the benefit of the light rays entirely from the upper disposed reflector element 4.

In Fig. 7 the lower disposed radial portion of the trough is made with a substantially flat surface, instead of being curved as shown in the Figs. 1 to 6 inclusive, which flat surface may be either plain, or else adorned and decorated with a suitable design or configuration, that will be illuminated and given due prominence by means of the concealed light source.

The practicability and utility of my novel form of semi-indirect lighting for store windows or show case purposes are shown in Figs. 11 and 12 of the drawings, any suitable means being employed for removably securing the light trough segments in their proper predetermined positions with respect to the structure. In the show case application I utilize a plurality of angled and apertured clips or fastening members 17, which closely engage the inner surface of the top plate and outer surface of the front or side plate, and serve as a supporting means for the trough segments.

What I claim as my invention and desire to secure by Letters Patent, is:—

1. In interior illumination, the combination with the walls of a room, of a removable light confining trough involving a supporting body structure designed to contact with and be securely fastened to the said walls, the lower portion of said body being provided with a ledge; suitable brace members secured to said body above the ledge; a radially disposed member constituting the exposed wall of the trough, which radial member is supported by the said brace members and aforesaid ledge; and lighting means concealed from view within the trough.

2. In interior illumination, the combination with the walls and ceiling of a room, of a removable light confining trough involving a supporting body structure designed to contact with and be securely fastened to the walls and ceiling, the upper section of the body being bent to form an overhanging section having a predetermined arc, the lower portion of said body being further bent to form a ledge; suitable brackets secured to said body adjacent to its lower extremity and above the said ledge; a radially disposed member constituting the exposed wall of the trough, said radial member being supported by the said brackets and aforesaid ledge; and lighting means confined within the trough.

3. In interior illumination, the combination with the walls of a room, of a removable light confining trough involving a supporting body structure designed to contact with and be securely fastened to the said walls, the lower portion of said body being provided with a ledge; suitable brace members secured to said body above the ledge; a radially disposed member constituting the exposed wall of the trough, which radial member is hingedly supported for adjustment by the said brace members, and further supported by the said ledge; and lighting means concealed from view within the trough.

4. In interior illumination, the combination with the walls and ceiling of a room, of a removable light confining trough involving a supporting body structure designed to contact with and be securely fastened to the walls and ceiling, the upper section of the body being bent at a suitable arc and retained in its functional position by brace members secured to the walls and ceiling, the lower portion of said body being provided with a ledge; suitable bracket members secured to the said body above the ledge; a radially disposed member constituting the exposed wall of the trough, which radial member is supported by the said brace members and aforesaid ledge and lighting means concealed from view within the trough.

5. In interior illumination, the combination with the walls and ceiling of a room, of a removable light confining trough involving a supporting body structure designed to contact with and be securely fastened to the walls and ceiling, the upper section of the body being bent at a suitable arc and retained in its functional curved position by brace members secured to the walls and ceiling, the lower portion of said body being further bent to provide a ledge; suitable brackets secured to the said body above the ledge; a radially disposed member constituting the exposed wall of the trough and supported by the said brace members and aforesaid ledge, the edge portions of said radial members being flanged to provide an interlocking function between contiguous trough segments; and lighting means concealed from view within the trough.

6. In interior illumination, the combination with the walls and ceiling of a room, of a removable light confining trough involving a supporting body structure designed to contact with and be securely fastened to the walls and ceiling, the upper section of the said body being bent at a suitable arc and retained in its functional curved position by brace members secured to the walls and ceiling, the lower portion of said body being further bent to provide a supporting ledge, and being further provided with a second ledge underneath the first mentioned ledge, designed as a wall molding; suitable bracket members secured to the body above the first mentioned ledge; a radially disposed member constituting the exposed wall of the trough, which radial member is supported by the said brace members and first mentioned ledge, the edge portions of said radial members being flanged to provide an interlocking function between contiguous trough segments; and lighting means concealed from view within the trough.

7. In interior illumination, the combination with the walls and ceiling of a room, of a removable light confining trough involving a supporting body structure designed to contact with and be securely fastened to the walls and ceiling, the upper section of said body being bent at a suitable arc and retained in its functional curved position by brace members secured to the walls and ceiling, the lower portion of said body being bent to provide a supporting ledge, and being further bent to provide a second ledge, underneath the first mentioned ledge, designed as a wall molding; suitable bracket members secured to the body above the first mentioned ledge; a radially disposed member constituting the exposed wall of the trough, which radial member is hingedly supported for adjustment by the said bracket members, and further supported by the said first mentioned ledge, the edge portions of said radial members being flanged to provide an interlocking function between contiguous trough segments; and lighting means concealed from view within the trough.

8. In interior illumination, the combination with a partition, of a plurality of transparent sections arranged in interlocking engagement at their ends to provide a substantially continuous light trough, said sections having an edge abutting the said partition, and lighting means within the trough.

9. In interior illumination, the combination with a partition, of a plurality of transparent sections arranged in interlocking engagement at their ends to provide a substantially continuous light trough, said sections being hinged at one edge and having the other edge abutting the said partition, and lighting means within the trough.

In testimony whereof I hereunto set my hand at Pittbsurgh, Penna., this 23d day of February, 1917.

EDWARD A. RICHTER.